United States Patent [19]
Yanou et al.

[11] Patent Number: 5,653,868
[45] Date of Patent: Aug. 5, 1997

[54] DIVERTER AND WATER PURIFIER HAVING SAME

[75] Inventors: Manabu Yanou; Ikuo Igami, both of Tokyo; Masaaki Okano; Osami Kato, both of Nagoya, all of Japan

[73] Assignee: Mitsubishi Rayon Company Ltd., Tokyo, Japan

[21] Appl. No.: 416,981

[22] Filed: Apr. 5, 1995

[30] Foreign Application Priority Data

Apr. 6, 1994 [JP] Japan .................. 6-068823
Nov. 4, 1994 [JP] Japan .................. 6-271496

[51] Int. Cl.$^6$ ......................................... B01D 35/02
[52] U.S. Cl. ............... 210/232; 210/418; 210/433.1; 210/459; 210/460
[58] Field of Search ............... 137/625.24; 210/232, 210/238, 418, 419, 424, 433.1, 449, 456, 459, 460, 416.3

[56] References Cited

U.S. PATENT DOCUMENTS

| | | | |
|---|---|---|---|
| 2,327,306 | 8/1943 | Holden | 210/449 |
| 3,789,991 | 2/1974 | Krongos | 210/460 |
| 4,172,796 | 10/1979 | Corder | 210/238 |
| 4,686,037 | 8/1987 | Lang | 210/282 |
| 4,972,876 | 11/1990 | Kabata et al. | 137/625.16 |
| 5,279,329 | 1/1994 | Pippel | 137/625.29 |

FOREIGN PATENT DOCUMENTS

| | | |
|---|---|---|
| 483820 | 1/1976 | Australia . |
| 0 276 416 | 8/1988 | European Pat. Off. . |
| 0 505 125 | 9/1992 | European Pat. Off. . |
| 84 34 109 | 5/1986 | Germany . |
| 57-181394 | 11/1982 | Japan . |

*Primary Examiner*—W. L. Walker
*Attorney, Agent, or Firm*—Oblon, Spivak, McClelland, Maier & Neustadt, P.C.

[57] ABSTRACT

A water purifier includes a diverter which can be detachably attached to a water faucet to select a plurality of water passages and a filter cartridge which can be detachably attached to the diverter to purify a water to be supplied through the diverter. The diverter is provided with a connector portion including a projection having a pair of guide grooves. The filter cartridge is provided with an engaging portion which can be inserted and fitted in the guide grooves. Disclosure is also directed to a diverter which includes a substantially cylindrical body which defines therein a main water passage to be connected to the faucet, and a rotatable selecting member which can be coaxially and rotatably fitted on the substantially cylindrical body and which is provided with a plurality of branch water passages which can be selectively registered with the main water passage of the substantially cylindrical body in accordance with the rotation of the selecting member.

27 Claims, 7 Drawing Sheets

DIVERTER AND WATER PURIFIER HAVING SAME

BACKGROUND OF THE INVENTION

1. Field of the Invention

The present invention relates to a diverter (switching valve assembly) which is detachably attached to a water faucet, etc., to selectively produce a "straight water flow (straight unfiltered flow)", a "shower water flow (spray unfiltered water flow)", and a "purified water flow", etc., and a water purifier having such a switching valve incorporated therein. The present invention also relates to a replaceable filter cartridge for a water purifier.

2. Description of the Related Art

An example of a known diverter for a water purifier for domestic use, to be attached to a water faucet is shown in FIG. 14. In FIG. 14, a valve body 1 is provided at the center portion thereof with an upright main water passage 2, and a rotatable hollow cylinder 3 which extends into the main water passage 2. The cylinder 3 is supported in the valve body 1 so as to rotate about a horizontal axis through a packing 4 in a water tight fashion. The cylinder 3 defines therein an axial water passage connected to the main water passage 2 through an elongated peripheral opening 3a formed on the cylinder 3 and is provided on the peripheral surface thereof with a plurality of through cross holes 5, 6 which open into the axial water passage. The cross holes 5 and 6 are located in an asymmetrical arrangement (different angular phases) with respect to the horizontal axis thereof. The cylinder 3 has a lever 7 integral therewith, which is manually rotated by an operator to rotate the cylinder 3 about the horizontal axis.

The valve body 1 is detachably attached to the faucet by a rotating ring 8. The valve body 1 is also provided on the lower center portion thereof with a first outlet passage 9 for a "straight unfiltered flow" which is directly below the main water passage 2 and which can be connected to the cross hole 5 in accordance with the rotation of the cylinder 3. In the vicinity of the outlet passage 9 is provided a second outlet passage 10 for a "spray unfiltered water flow", which can be connected to the cross hole 6 in accordance with the rotation of the cylinder 3. An annular shower attachment (not shown) can be attached to a threaded lower end 11 of the valve body 1.

In the known diverter, when the cylinder 3 is rotated in a predetermined direction about the horizontal axis through the lever 7 by an operator or user, the cross hole 5 is registered with the first outlet passage 9, so that the water flowing from the faucet (not shown) into the main water passage 2 of the valve body 1 is introduced into the first outlet passage (straight flow passage) 9 through the axial water passage of the cylinder 3 and the cross hole 5 of the cylinder 3 connected to the straight flow passage 9.

When the cylinder 3 is rotated in the reverse direction by an operator or user to register the cross hole 6 with the second outlet passage (shower flow passage) 10, the water flowing from the faucet into the main water passage 2 of the valve body 1 is introduced into the shower flow passage 10 through the axial water passage of the cylinder 3 and the cross hole 6 of the cylinder 3. Thus, a shower type flow from the shower flow passage 10 is obtained.

As can be seen from the above discussion, in the prior art, the main water passage 2, the cylinder 3, the straight flow passage 9 (and shower flow passage 10) and the shower attachment (not shown), etc., are arranged in the vertical direction, thus resulting in an increase of the total height (vertical length) of the water purifier (or diverter). Consequently, when the diverter is attached to the faucet, there is only a limited working space provided between the lower end of the diverter and a bottom surface of an associated sink. This is inconvenient for a user to cook or wash dishes, etc. Moreover, the cylinder 3 which is provided in the valve body 1 so as to rotate about the horizontal axis complicates the structure and increases the number of components, leading to an increased manufacturing cost.

Moreover, in a conventional water purifier having a diverter to be attached to a faucet of a water supply pipe and a repleaceable filter cartridge detachably attached to the diverter to purify the water supplied from the water supply pipe through the diverter, the connecting mechanism (attachment mechanism) between the diverter and the filter cartridge is usually realized by male and female threads or screws provided on the connecting ends of the diverter and the filter cartridge with the help of a nut. However, connection using the screw engagement is a time consuming and troublesome operation.

SUMMARY OF THE INVENTION

The primary object of the present invention is to provide a simple, small and inexpensive diverter having a reduced height and smaller number of components, which can provide sufficient working space between the switching valve and the bottom of the associated sink when the diverter valve is attached to the faucet.

Another object of the present invention is to provide a replaceable filter cartridge which can be easily attached to and detached from a diverter.

Still another object of the present invention is to provide an improved water purifier including a diverter and a replaceable filter cartridge.

According to an aspect of the present invention, there is provided a diverter which can be detachably attached to a water faucet to select a plurality of water passages, comprising a substantially cylindrical body which defines therein a main water passage to be connected to the faucet, a rotatable selecting member which can be coaxially and rotatably fitted on the substantially cylindrical body and which is provided with a plurality of branch water passages which can be selectively registered with the main water passage of the substantially cylindrical body in accordance with the rotation of the selecting member.

The rotatable selecting member is provided with, for example, three branch passages for a straight unfiltered water flow, a spray unfiltered water flow and a flow to be purified.

The substantially cylindrical body can be provided on the peripheral side wall thereof with at least one cross hole which is connected to the main water passage and which opens into the outer peripheral surface of the substantially cylindrical body.

A rotating ring which is provided on the substantially cylindrical body to detachably attach the diverter to the faucet can be provided.

The selecting member is provided with outlet openings connected to the branch water passages for a straight unfiltered water flow and a spray unfiltered water flow.

It is possible to attach a spray attachment to the bottom of the selecting member to cover the outlet opening for a spray unfiltered water flow.

Preferably, the selecting member is provided with a connecter portion to which a filter cartridge can be detachably attached. The connector portion can be comprised of a projection having a pair of guide grooves. The guide grooves can be each provided with a curved bottom surface whose height gradually increases in a predetermined direction. Also, the guide grooves can be each provided with a locking bottom surface portion stepped with respect to the curved bottom surface.

In an embodiment, at least one of the branch water passages has an exposed open outlet end to which a filter cartridge can be connected. The guide grooves are located in a symmetrical arrangement with respect to an axis of the open outlet end of the at least one branch passage.

According to another aspect of the present invention, there is provided a filter cartridge which can be detachably attached to a diverter which can be in turn detachably attached to a water faucet to select a plurality of water passages and which is provided with a connector portion including a projection having a pair of guide grooves, to purify a water to be supplied through the diverter, wherein said filter cartridge comprises an engaging portion which can be inserted and fitted in the guide grooves.

The guide grooves can be each provided with a curved bottom surface whose height gradually increases in a predetermined direction, and wherein said engaging portion of the filter cartridge is provided with a pair of elastically deformable arms which are elastically deformed by the curved bottom surfaces of the guide grooves during the insertion of the engaging portion in the guide grooves.

The guide grooves can be each provided with a locking bottom surface portion stepped with respect to the curved bottom surface, and wherein said elastically deformable arms of the engaging portion of the filter cartridge are each provided with an enlarged head which can be engaged by the locking bottom surface portions of the guide grooves when the elastically deformable arms of the engaging portion of the filter cartridge are completely fitted in the corresponding guide grooves. According to still another aspect of the present invention, there is provided a water purifier comprising a diverter which can be detachably attached to a water faucet to select a plurality of water passages and a filter cartridge which can be replaceably attached to the switching valve to purify a water to be supplied through the diverter, wherein the diverter is provided with a connector portion including a projection having a pair of guide grooves, said filter cartridge is provided with an engaging portion which can be inserted and fitted in the guide grooves.

Preferably, the diverter comprises a substantially cylindrical body which defines therein a main water passage to be connected to the faucet, and a rotatable selecting member which can be coaxially and rotatably fitted on the substantially cylindrical body and which is provided with a plurality of branch water passages which can be selectively registered with the main water passage of the substantially cylindrical body in accordance with the rotation of the selecting member.

The guide grooves can be each provided with a curved bottom surface whose height gradually increases in a predetermined direction, and wherein said engaging portion of the filter cartridge is provided with a pair of elastically deformable arms which are elastically deformed by the curved bottom surfaces of the guide grooves during the insertion of the engaging portion in the guide grooves.

The guide grooves can be each provided with a locking bottom surface portion stepped with respect to the curved bottom surface, and wherein said elastically deformable arms of the engaging portion of the filter cartridge are each provided with an enlarged head which can be engaged by the locking bottom surface portions of the guide grooves when the elastically deformable arms of the engaging portion of the filter cartridge are completely fitted in the corresponding guide grooves.

Provision is made of a clipper which can be attached to the connecting portion between the switching valve and the filter cartridge to hold the connecting portion.

The clipper can be provided with a pair of side plates and a connecting plate which connects the side plates to form a generally U-shaped cross section, so that the side plates can be elastically deformed.

BRIEF DESCRIPTION OF THE DRAWINGS

The invention will be described below in detail with reference to the accompanying drawings, in which.

DESCRIPTION OF THE PREFERRED EMBODIMENT

Figure 1:
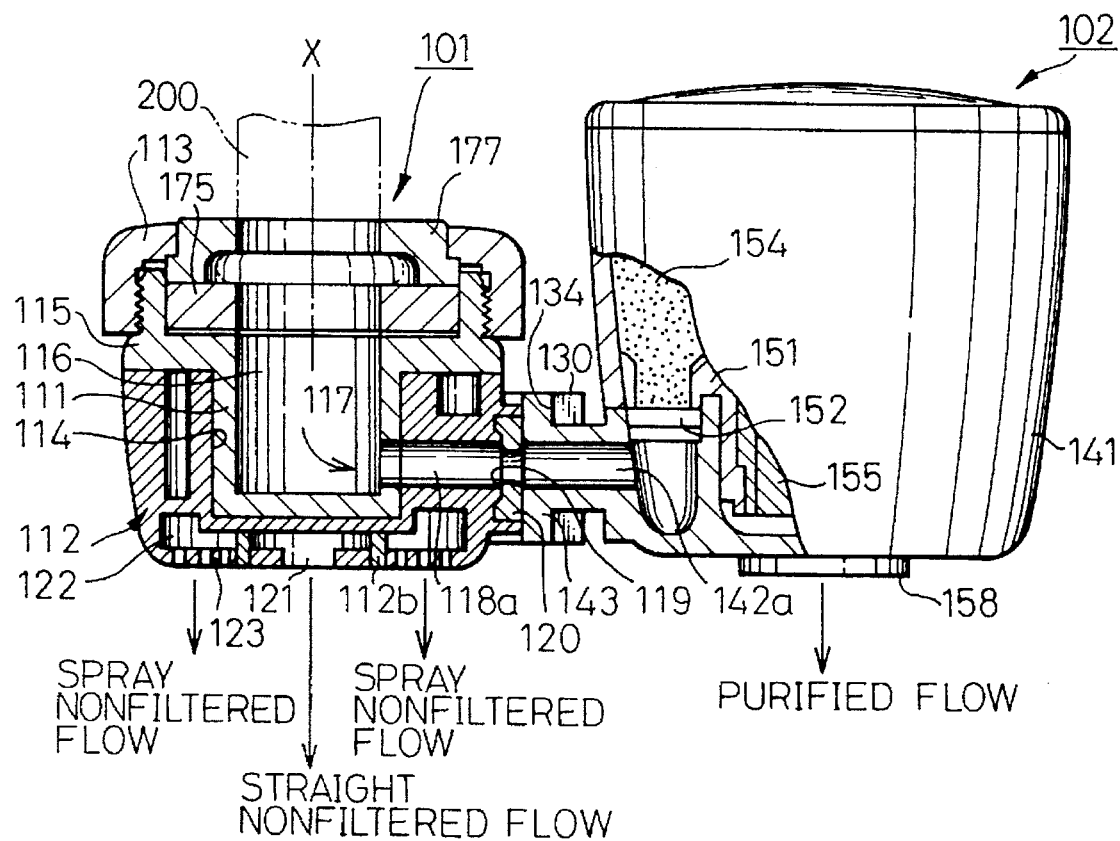
FIG. 1 is a partially sectioned front elevational view of a water purifier having a diverter and a filter cartridge according to an embodiment of the present invention.
Figure 2:
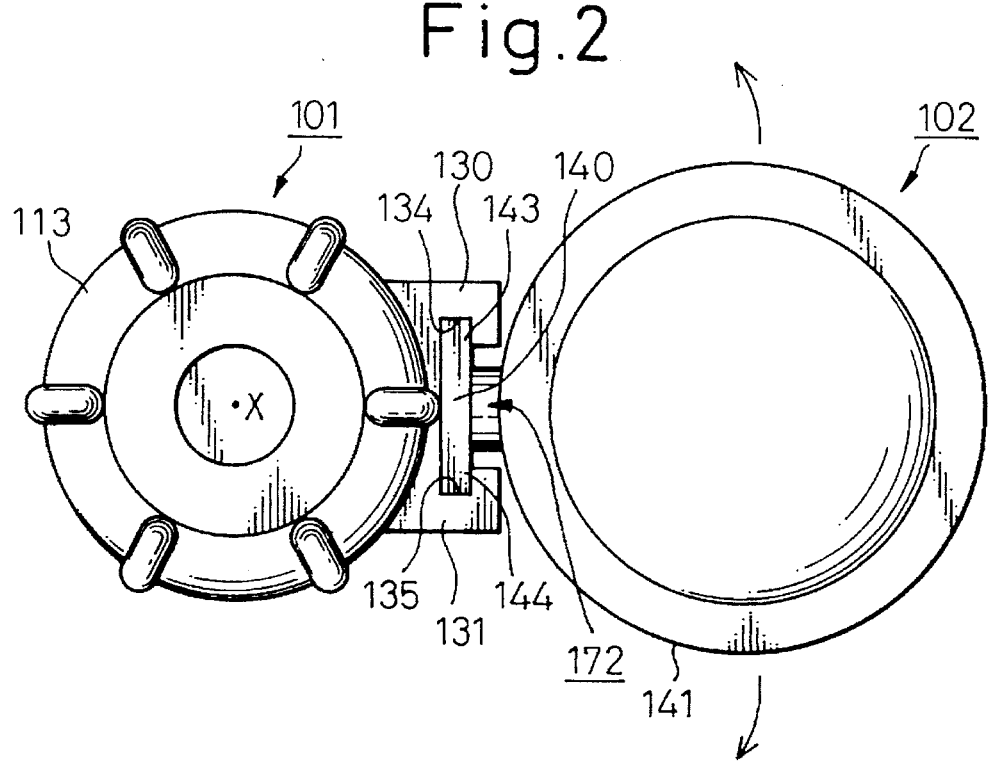
FIG. 2 is a top view of a water purifier shown in FIG. 1.

FIGS. 1 and 2 show a partially sectioned side elevational view and a plan view of a water purifier according to the present invention.

The water purifier essentially includes a diverter 101 which can be detachably attached to a faucet 200 of a water supply pipe to select the water flow and a replaceable filter cartridge 102 which is detachably connected to the diverter 101 to filter the water supplied from the faucet 200 through the switching valve 101 to produce a purified water flow.

The diverter 101 is comprised of a cylindrical shaft body (cylindrical portion) 111, a rotatable selecting member 112 which is rotatably attached to the outer peripheral surface of the shaft body 111, and a rotating ring 113 which is rotatably and coaxially mounted to the upper end of the shaft body 111. The diverter 101 can be detachably attached to the faucet 200 by the rotating ring 113 through a sealing packing 175 in a water tight fashion.

The shaft body 111 is provided with a bottomed cylinder 114 and an annular flange 115 provided on the upper end of the cylinder 114 integral therewith. The cylinder 114 defines therein a water passage 116 having an upper open end to be connected to the faucet 200 to which the diverter 101 is attached. The cylinder 114 is provided on the peripheral wall thereof with a circular cross through hole (opening) 117 opening into the water passage 116.

Figure 9:
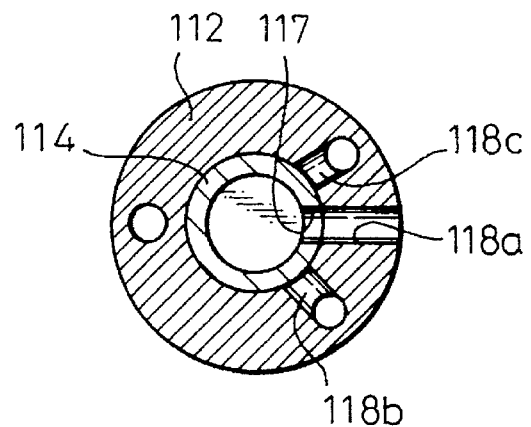
FIG. 9 is an explanatory sectional plan view of a shaft body and a rotatable selecting member of a diverter shown in FIG. 1.

The rotatable selecting member 112 is rotated to select a "straight unfiltered water flow", a "spray unfiltered water flow", or a "purified water flow". For the purified water flow, the water is introduced into the filter cartridge 102, as will be discussed hereinafter. The selecting member 112 is comprised of a plurality of radially extending lateral circular holes (branch passages) 118a, 118b and 118c (FIG. 9) at the same height level in the axial direction (vertical direction), so that the lateral holes 118a, 118b and 118c can be selectively connected to the through hole 117 of the cylinder 114 in accordance with the rotation of the selecting member 112. The branch passage 118a extends through the side wall of the selecting member 112 in the radial direction to form a first branch passage for the cartridge 102. The first branch passage 118a is provided on the outer end thereof with an outlet opening (cartridge opening) 119. The outlet opening 119 is sealed by an annular packing 120 having an opening 120a (FIG. 4) corresponding to the first branch passage 118a.

The second and third branch passages 118b and 118c extend in the radial directions of the side wall of the selecting member 112 and are bent downward at the intermediate portions thereof to be connected to an outlet passage 121 for a straight unfiltered water flow (referred to as a straight outlet passage) and an outlet passage 122 for a spray unfiltered water flow (referred to as a spray or shower outlet passage). The straight outlet passage 121 which is, for example, in the form of a circular opening and the spray outlet passage 122 which is, for example, in the form of an annular opening are formed at the lower end of the selecting member 112. The straight outlet passage 121 and the spray outlet passage 122 are independent from one another by an annular wall 112b provided on the lower end of the selecting member 112.

The spray outlet passage 122 is closed by an annular spray or shower attachment 123 detachably attached to the bottom of the selecting member 112 through a sealing packing (not shown). The shower attachment 123 has a lot of pores to produce a shower type flow (spray flow) of water passing therethrough.

Figure 3:
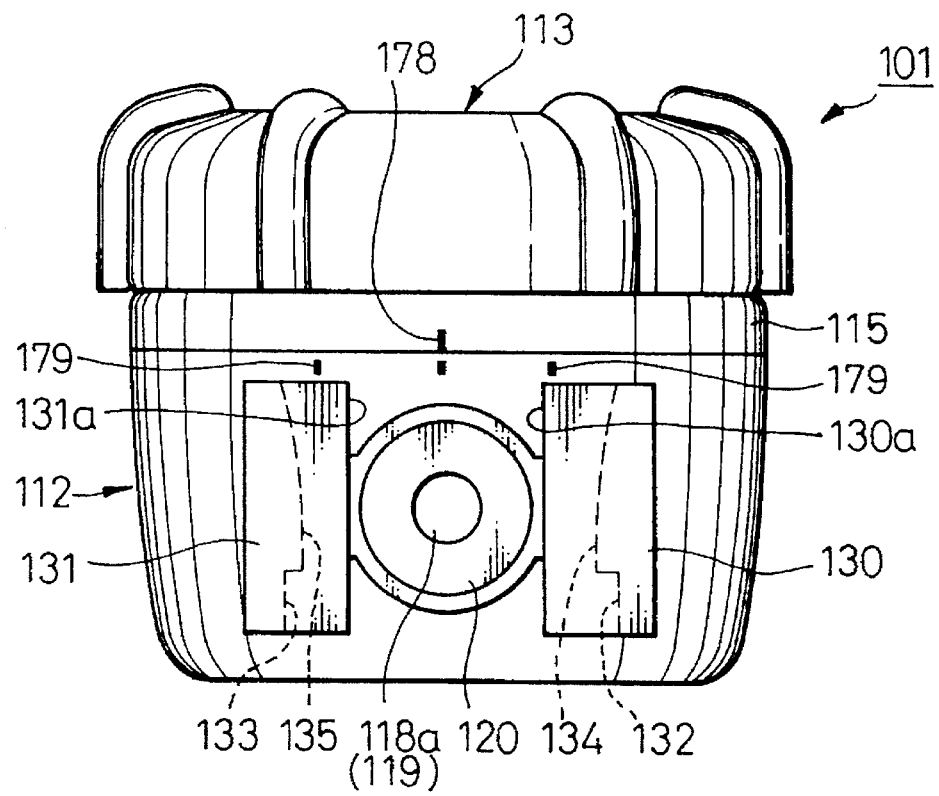
FIG. 3 is a side elevational view of a diverter in a water purifier shown in FIG. 1.

The selecting member 112 is provided on the peripheral surface thereof with a pair of opposed projections 130 and 131 located on opposite sides of the cartridge opening 119, as shown in FIG. 2 or 3. The projections 130 and 131 are each provided with a generally U-shaped guide groove 134 (or 135) extending in a direction parallel with the axis X of the selecting member 112. The projections 130 and 131 are made integral with the selecting member 112 in a symmetrical arrangement with respect to the central axis of the cartridge opening 119 to form a generally angular C-shape projection as viewed in a plan view shown in FIG. 2.

Figure 4:
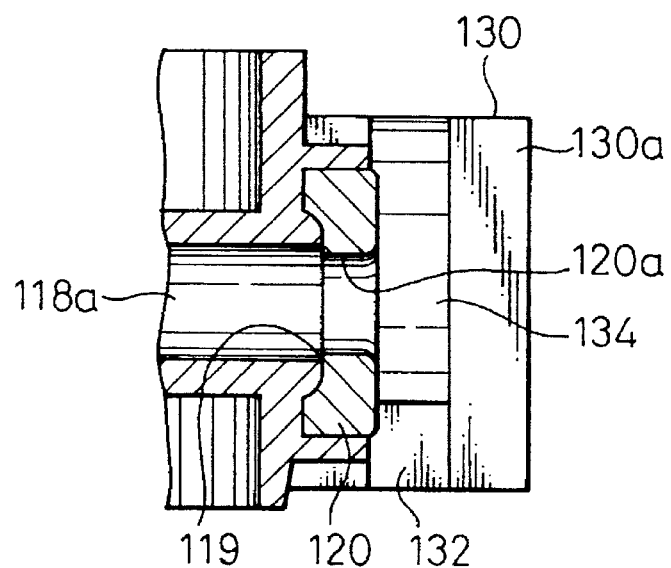
FIG. 4 is an enlarged sectional view of a main part of a diverter shown in FIG. 1.
Figure 5:
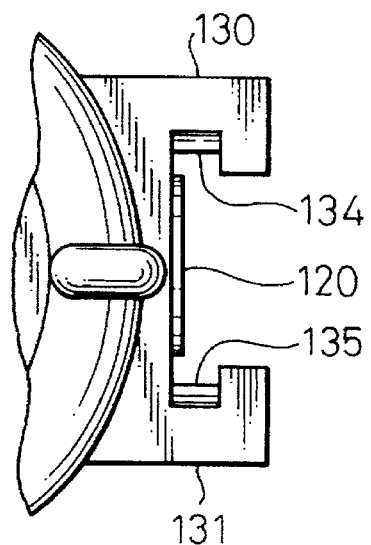
FIG. 5 is an enlarged plan view of FIG. 4.

Looking at FIGS. 3, 4 and 5, the identical guide grooves 134 and 135 formed on the opposed surfaces 130a and 131a of the projections 130 and 131 are provided with smoothly curved bottom surfaces whose height gradually increases from the upper end toward the lower end in FIG. 3. The bottoms of the projections 130 and 131 are also provided with stepped bottom surfaces 132 and 133 which constitute locking or engaging portions. Namely, the distance between the bottom surfaces of the opposed guide grooves 130 and 131 gradually decreases from the upper ends to the lower ends of the projections 130 and 131, except for the stepped locking bottom surfaces (flat surfaces) 132 and 133.

Figure 6:
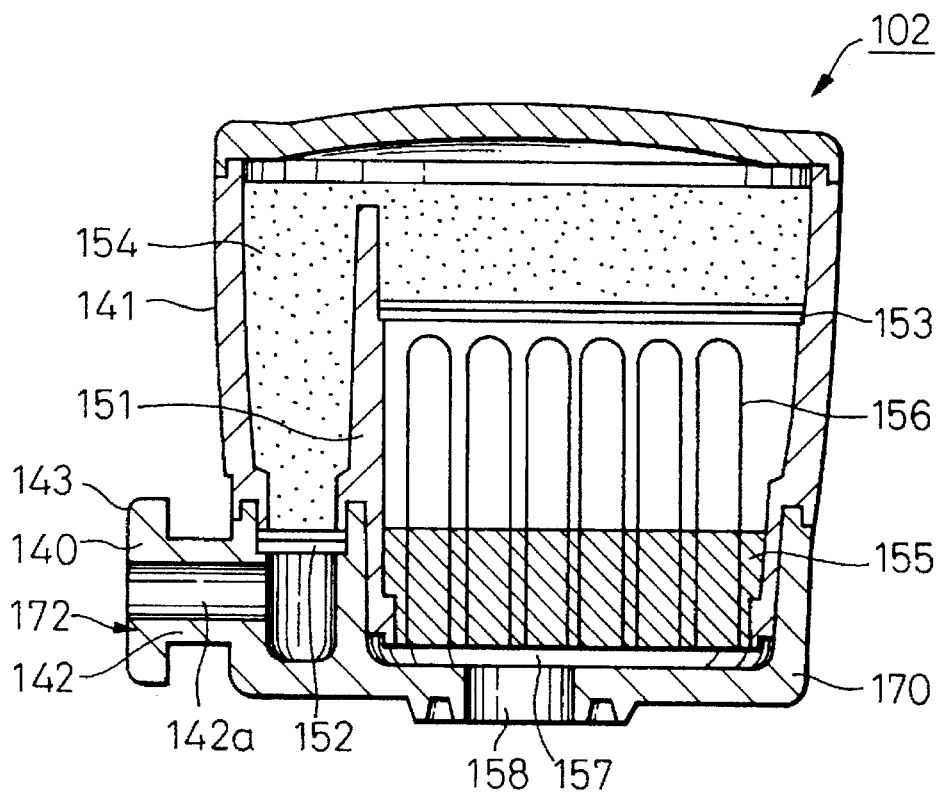
FIG. 6 is a sectional view of a filter cartridge in a water purifier shown in FIG. 1.

The replaceable filter cartridge 102 is comprised of a hollow casing 141, and a bottom casing 170 integrally formed with the hollow casing 141, as shown in FIG. 6. The bottom casing 170 is provided with a generally T-shaped projection 172 as viewed in a plan view shown in FIG. 2. The projection 172 is comprised of a shaft portion 142 and a generally rectangular shaped plate portion 140 provided at the front end of the shaft portion 142. The shaft portion 142 is provided therein with a water passage 142a (FIG. 6) which can be connected to the cartridge opening 118a of the diverter 101 through the annular sealing packing 120.

Figure 7:
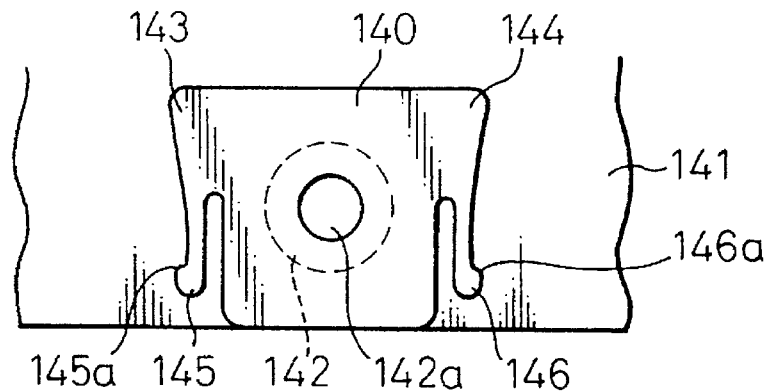
FIG. 7 is a left side elevational view of a main part of FIG. 6.

As may be seen in FIG. 7, the plate portion 140 defines at the opposite sides thereof engaging portions (projections from the shaft portion 143 and 144) corresponding to the guide grooves 134 and 135 of the selecting member 112, so that the engaging portions 143 and 144 can be engaged in the corresponding guide grooves 134 and 135 when the filter cartridge 102 is attached to the diverter 101. The engaging portions 143 and 144 are respectively provided with elastically deformable arms 145 and 146 which extend downward therefrom. The elastically deformable arms 145 and 146 are provided on the front ends (free ends) thereof with enlarged heads 145a and 146a (projections) that project outward away from the water passage 142a from the front ends of the elastically deformable arms 145 and 146. The enlarged heads 145a and 146a are preferably spherical or semi-spherical.

Turning back to FIG. 6, the hollow casing 141 of the filter cartridge 102 receives therein an upright separation plate 151 in the vicinity of the water passage 142a. There is a first perforated separation filter 152 provided on the side of the separation plate 151 adjacent to the water passage 142a and somewhat above the latter. A second perforated separation filter 153 is provided on the other side of the separation plate 151 and at the upper portion of the hollow casing 141.

An adsorbent (water purifying or filtering layer) 154 made of, for example, activated carbon (particles, powder or fiber), an ion-exchange resin, or calcium sulphite, etc., or a mixture of these components is provided on the first and second perforated filters 152 153 to absorb or adsorb and remove odors or organic impurities in the water to be supplied. Moreover, a filter (water purifying or filtering layer) 156 made of, for example, a hollow fiber membrane is provided in a space of the upper casing 141 on the right side of the first perforated separation filter 151 and below the second perforated separation filter 153 to remove rust or bacteria, etc. The filter 156 is held by a holder 155 which is in turn held by the upper casing 141. The bottom casing 170 defines therein a purified water gathering chamber 157 below the filter 156. The bottom casing 170 is provided with a bottom opening (discharge port) 158 which is connected to the purified water gathering chamber 157 and opens into the atmosphere, so that the water purified through the filter cartridge 102 can be discharged from the discharge port 158.

To attach the filter cartridge 102 to the diverter 101, the engaging portions 143 and 144 of the cartridge 102 are inserted from above in the corresponding guide grooves 134 and 135 of the selecting member 112 of the diverter 101, so that the heads 145a and 146a of the elastically deformable arms 145 and 146 are engaged by the engaging surfaces 132 and 133 of the guide grooves 134 and 135. During the insertion, the elastically deformable arms 145 and 146 are elastically deformed in a direction to come close to each other. As soon as the enlarged heads 145a and 146a ride over the ends of the curved bottom surfaces of the guide grooves 134 and 135 and reach the stepped engaging surfaces 132 and 133, the elastically deformed arms 145 and 146 are returned to the original state due to the resilient restoring force, so that the engaging portions 143 and 144 can be firmly held in the corresponding guide grooves 134 and 135. Hence, the filter cartridge 102 can be extremely easily and certainly detachably connected to the diverter 101 within an extremely short space of time.

Once the enlarged heads 145a and 146a are engaged by the engaging surfaces 132 and 133, no accidental movement of the engaging portions 143 and 144 from the guide grooves 134 and 135 occurs, and hence, no accidental detachment of the filter cartridge 102 from the diverter 101 takes place.

It should be appreciated here that the width between the upper ends of the engaging portions 143 and 144 (i.e., the width of the upper edge of the plate portion 140) is large enough to prevent the plate portion 140 from passing over and through the lower ends (in FIG. 3) of the curved bottom surfaces of the guide grooves 134 and 135. Consequently, no detachment of the filter cartridge 102 from the diverter 101 in the downward direction occurs.

To detach the filter cartridge 102 from the diverter 101, for example, for the purpose of exchange with a new one or repair, etc., a strong upward force above a predetermined value is applied to the filter cartridge 102 from the bottom thereof, so that the enlarged heads 145a and 146a of the elastically deformable arms 145 and 146 displaced on the engaging surfaces 132 and 133 of the guide grooves 134 and 135 are forced to ride over the lower ends of the curved bottom surfaces owing to the semi-spherical shape of the enlarged heads, while elastically deforming the elastically deformable arms 145 and 146 to come close to each other. Once the heads 145a and 146a ride over the lower ends of the curved bottom surfaces, the engaging portions 143 and 144 can be easily disengaged from the guide grooves 143 and 144 by the upward displacement of the filter cartridge 102, since the distance between the curved bottom surfaces of the guide grooves gradually increases during the disengagement movement.

Thus, a user can easily exchange the old or exhausted filter cartridge with a new filter cartridge.

To select the "straight unfiltered water flow" or "spray unfiltered water flow", the user rotates the filter cartridge 102 (or the selecting member 112) in the clockwise or counterclockwise direction (indicated by arrows in FIG. 2) by a predetermined angle to selectively register the second or third branch passage 118b or 118c with the cross hole 117 of the cylinder 114. In the embodiment illustrated in FIG. 9, when the filter cartridge 102 (or the selecting member 112) is rotated in the clockwise direction by approximately 45°, the second branch passage 118c is connected to the cross hole 117, and when the filter cartridge 102 (or the selecting member 112) is rotated in the counterclockwise direction by approximately 45°, the third branch passage 118b is connected to the cross hole 117, respectively. It goes without saying that the angular arrangement or the number of the branch passages 118 (118a, 118b, and 118c) is not limited to the illustrated embodiment, and can be optionally designed.

Preferably, three markings 179 (FIG. 3) which indicate angular positions of the selecting member 112 or the filter cartridge 102 corresponding to the "straight unfiltered water flow", the "spray unfiltered water flow" and the "purified water flow" are provided on the side surface of the selecting member 112 (or the filter cartridge 102). To this end, a reference marking 178 is provided for example on the flange 115 of the shaft body 111, so that when any one of the markings 179 is registered with the reference marking 178, the "straight unfiltered water flow", the "spray unfiltered water flow" or the "purified water flow" is established.

When a user wants to use or drink purified water dispensed through the filter cartridge 102, the latter is attached to the diverter 101 attached to the water faucet 200 (FIG. 1) by the rotating ring 113 through the fastening ring 177 and the sealing packing 175, as mentioned above. The selecting member 112 is rotated directly or through the filter cartridge 102 to come to the angular position for the "purified water flow", in which the branch passage 118a is connected to the cartridge opening 117. Consequently, the water supplied from the water supply pipe through the faucet 200 is introduced into the main passage 116 of the shaft body 111. The water discharged from the outlet port 119 is introduced into the water inlet passage 142a of the filter cartridge 102. The water then passes through the first perforated separation filter 152, the adsorbent 154, the second perforated separation filter 153, the filter 156, and is discharged from the discharge port 158 of the water gathering chamber 157. During passing through the adsorbent 154 and the filter 156, the water is purified.

As can be understood from the above discussion, the filter cartridge 102 can be extremely easily and quickly attached to the diverter 101 only by inserting the engaging portions 143 and 144 on the filter cartridge side in the corresponding guide grooves 134 and 135 on the diverter side without need for an additional separate connecting member, such as a fastener, etc., between the diverter and the filter cartridge. Namely, only one simple fitting operation is necessary to attach or detach the filter cartridge 102 to or from the diverter 101, thus resulting in a reduction of the time necessary for the attachment or detachment operation. It should be appreciated that no connecting mechanism using male and female screws (threaded portions) is employed in the present invention to connect the filter cartridge to the diverter, which simplifies the connecting operation.

Moreover, since the heads 145a and 146a of the elastically deformable arms 145 and 146 are engaged by the engaging surfaces 132 and 133 of the guide grooves 133 and 134 stepped with respect to the curved bottom surfaces thereof, when the filter cartridge 102 is attached to the diverter 101, no accidental detachment of the filter cartridge from the diverter occurs.

Figure 10:
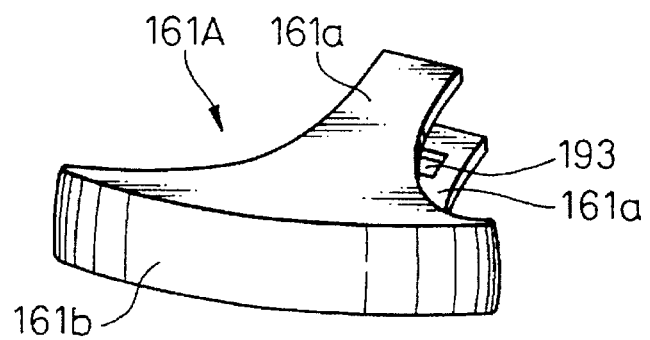
FIG. 10 is a perspective view of a modified embodiment of a clipper shown in FIG. 8.

Furthermore, according to the present invention, in comparison with the prior art shown in FIG. 10, the total height of the switching valve (and the purifier) can be reduced since the immovable shaft portion is coaxially fitted in the rotatable selecting member, so that a large working space can be provided between the bottom of the switching valve and the bottom surface of the sink. In addition, the number of the components of the switching valve in the present invention is smaller than the components of the switching valve shown in FIG. 10.

Different kinds of water flow can be easily obtained by the rotation of the selecting member 112 or the filter cartridge 102.

Although the switching valve 101 is comprised of the shaft body 111, the rotatable selecting ring 112, and the rotary ring 113, in the illustrated embodiment, the structure of the diverter is not limited to the illustrated embodiment. Namely, the filter cartridge 102 can be applied to any diverter 101 having an exposed branch passage corresponding to the branch passage 118a. For instance, it is possible to provide a plurality of cross holes (water passages) on the side wall of the inner cylinder (cylindrical shaft portion) which can be selectively connected to the branch passages of the selecting member in accordance with the rotation thereof.

Figure 8:
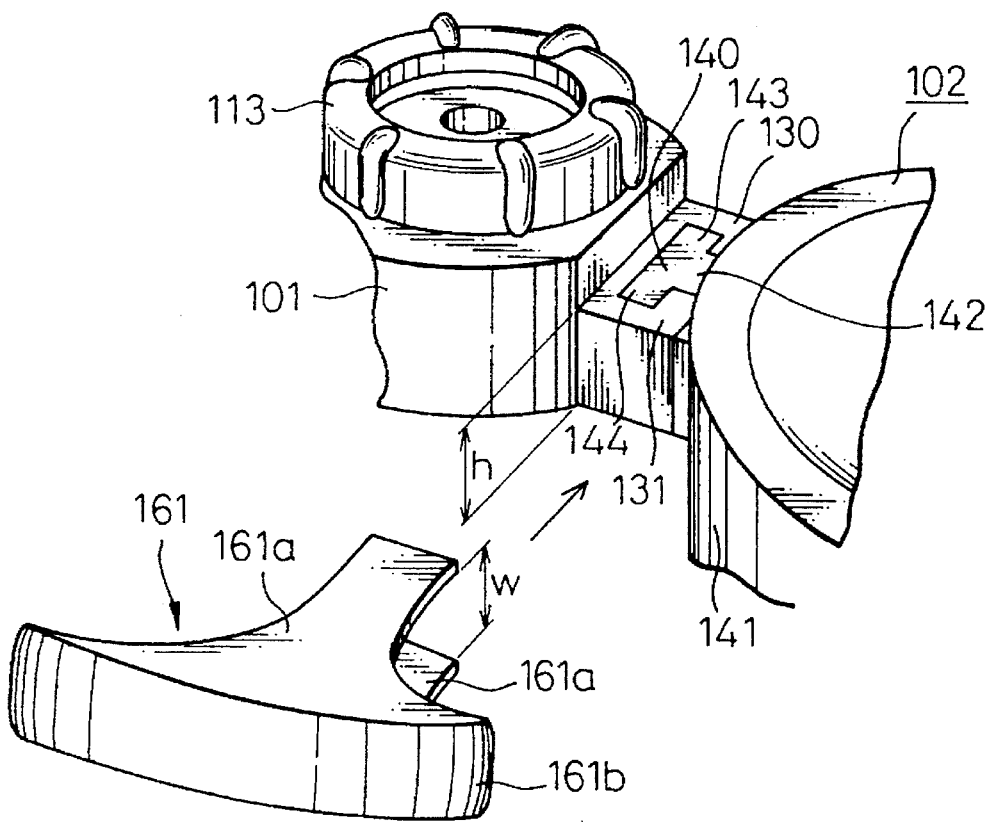
FIG. 8 is a perspective view of another embodiment of the present invention.

FIG. 8 shows another embodiment of the connecting mechanism between the filter cartridge 102 and the diverter 101. In FIG. 8, there is provided a clipper 161 having a generally U-shaped cross section. The clipper 161 is made of a pair of side plates 161a and 161b of a generally rounded T-shape and a connecting plate 161b which connects the opposed side plates 161a and 161b. The clipper 161 exhibits a flexibility or elastic deformability due to the shape thereof. The width (space) "w" between the opposed side plates 161a and 161b is slightly smaller than the height "h" of the projections 130, 131 (or the plate portion 140). After the engaging portions 143 and 144 of the plate portion 140 are fitted in the guide grooves 134 and 135, the clipper 161 is detachably fitted on the plate portion 140 and the projections 130 and 131 at the upper and lower sides thereof.

Namely, when the clipper 161 is fitted on the plate portion 140 and the projections 130 and 131, the plate portion 140 and the projections 130 and 131 are held by the clipper 161 due to the resilient force of the side plates 161a and 161b which have been elastically slightly expanded to fit the plate portion 140 and the projections 130 and 131 therebetween.

Moreover, since the side plates 161a and 161b cover the engaging portions between the plate portion 140 and the projections 130, 131 at the upper and lower sides, a more reliable connection between the diverter and the filter cartridge can be established.

FIG. 10 shows a still another embodiment of a clipper shown in FIG. 8. The clipper 161A shown in FIG. 10 is provided on the lower plate 161a (one of the opposed side plates 161a) thereof, with an opening, hole, or recess 193. The other structure of the clipper 161A is substantially the same as the clipper 161.

Figure 11:
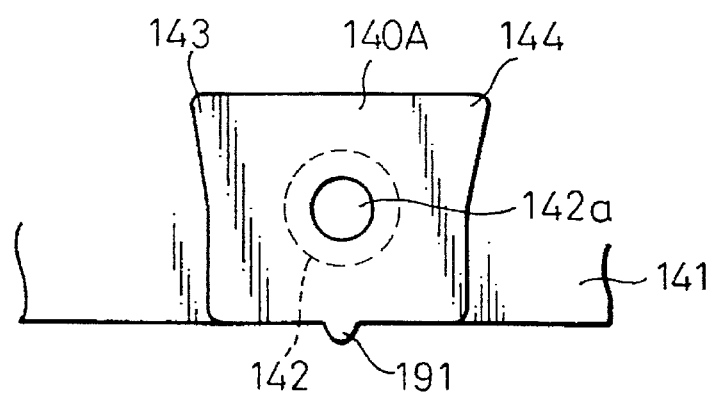
FIG. 11 shows a right side elevational view of a main part of an engaging portion of a cartridge, modified so as to be engaged by a clipper shown in FIG. 10.

In connection with this modification, a small projection 191 (FIG. 11) is provided on the lower edge of the plate portion 140 of the cartridge 102. The plate portion provided with the projection 191 is indicated by 140A in FIG. 11. The elastically deformable arms 145 and 146 shown in FIG. 7 can be dispensed with in the modified embodiment shown in FIG. 11. It is possible to provide elastically deformable arms 145 and 146 with enlarged heads 145a and 146a, as shown in FIG. 7, on the plate portion 140A shown in FIG. 11, but the elastically deformable arms 145 and 146 can be dispensed with in the modified embodiment shown in FIG. 11. If the plate portion 140 has no elastically deformable arms 145 and 146 (FIG. 7), the shape of the guide grooves 134 and 135 (FIG. 5, etc.) of the switching valve 101 are correspondingly modified so as to snugly fit the plate portion 140A in the guide grooves 134 and 135.

Figure 12:
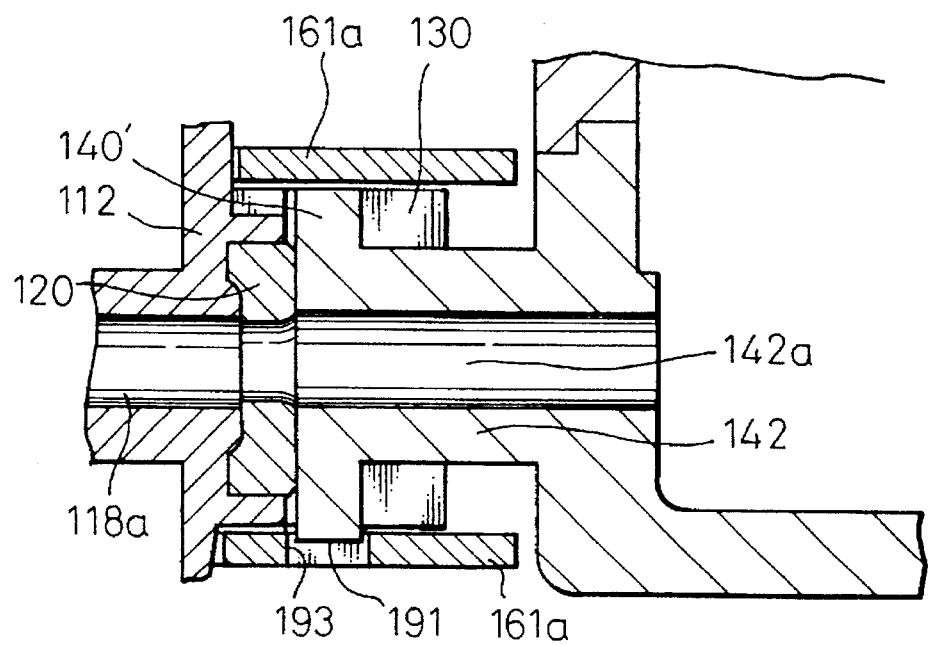
FIG. 12 is a sectional view of a connecting portion between a cartridge shown in FIG. 11 and a switching valve, and a clipper shown in FIG. 10 attached to the connecting portion.

When the clipper 161A is attached to the connectiong portion (engaging portion) between the cartridge 102 and the switching valve 101, as discussed above with reference to FIG. 8, the projection 191 of the plate portion 140A is fitted in the opening or hole 193 of the clipper 161A, so that the clipper 161A can be firmly attached to the connecting portion (engaging portion) between the cartridge 102 and the switching valve 101 to cover or protect the same, as shown in FIG. 12. The clipper 161A can be detached from the connecting portion (engaging portion) between the cartridge 102 and the switching valve 101 when a predetermined external force strong enough to disengage the projection 191 from the opening 193 is applied thereto.

Figure 13:
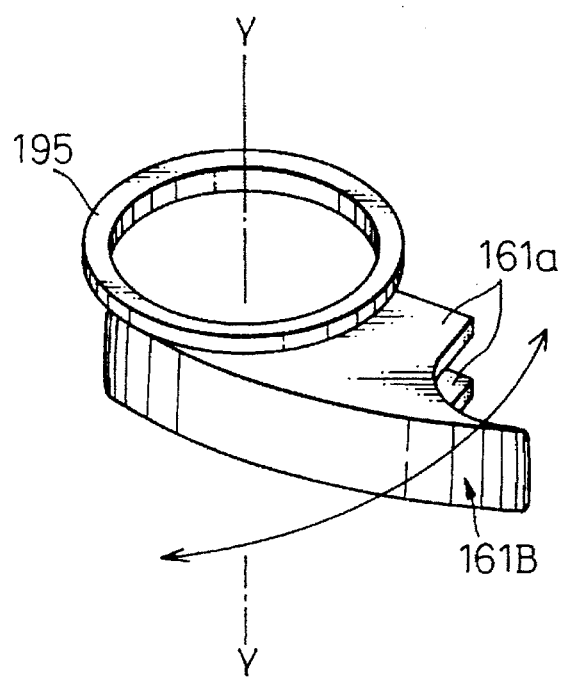
FIG. 13 is a perspective view of a still another embodiment of a clipper shown in FIG. 8; and, FIG. 14 shows a partially broken perspective view of a known diverter for a water purifier.
Figure 14:
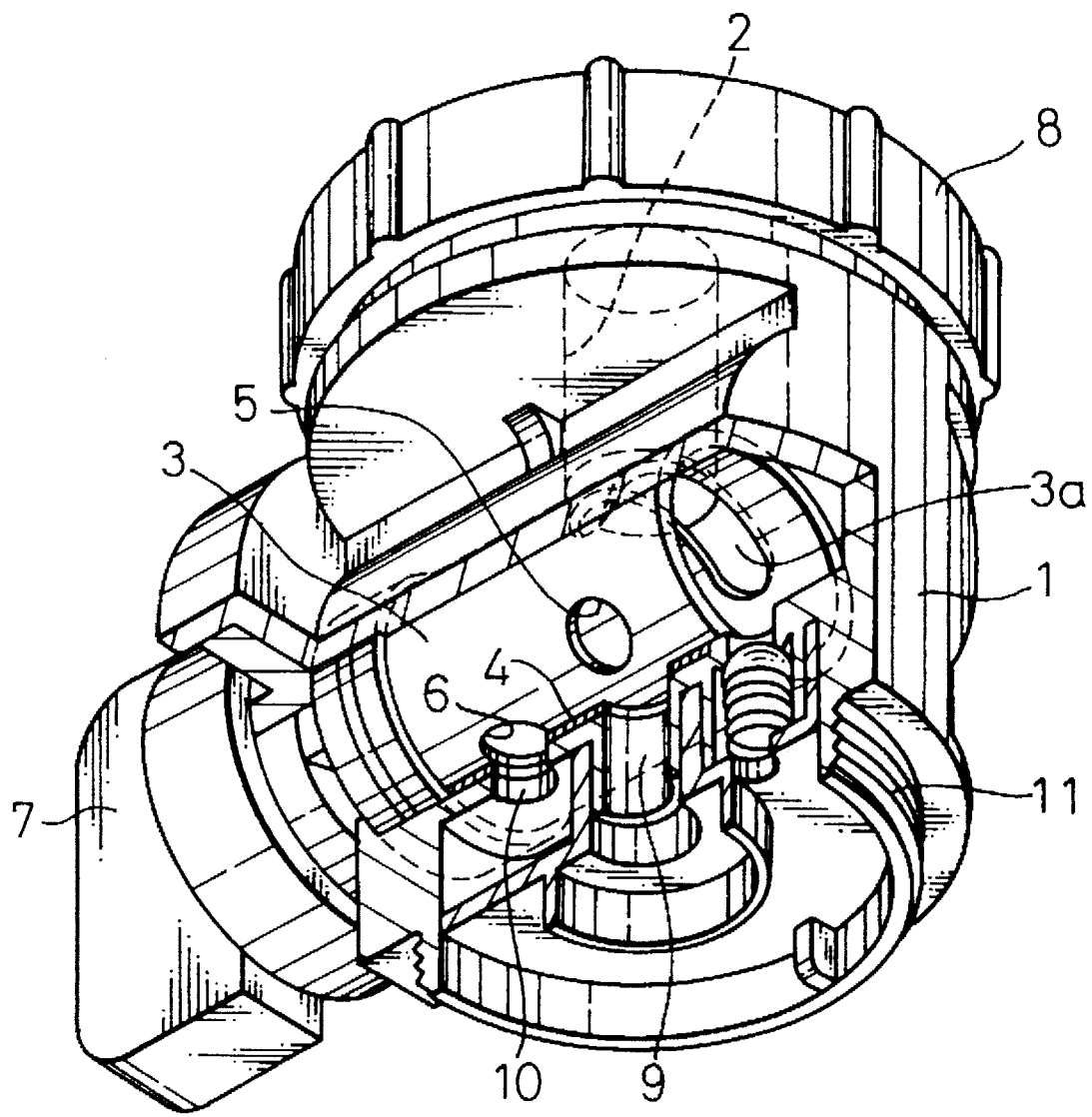

FIG. 13 shows still another embodiment of a clipper. The clipper 161B shown in FIG. 13 is additionally provided with a ring 195 integral therewith, in comparison with the clipper 161 shown in FIG. 8 or the clipper 161A shown in FIG. 10. The ring 195 whose axis Y—Y is coaxial to the axis X—X (FIG. 1) is rotatably attached to the switching valve, for example, between the rotary ring 113 and the annular flange 115 of the shaft body 111 or between the annular flange 115 of the shaft body 111 and the selecting member 112 so as to rotate about the axis Y—Y (accordingly X—X), with respect to the rotary ring 113 and the annular flange 115 in the directions indicated by arrows in FIG. 13. The clipper 161B is rotatable between a closed position in which the connecting portion (engaging portion) between the cartridge 102 and the switching valve 101 is closed and covered by the clipper 161B, and an open position in which the connecting portion between the cartridge 102 and the switching valve 101 is opened or exposed, so that the cartridge can be detached from the switching valve, as mentioned above.

According to the embodiment illustrated in FIG. 13, it is not necessary to detach the clipper 161B when a user detaches the cartridge from the switching valve attached to the faucet, for example, for the purpose of an exchange of the cartridge. Namely, when the cartridge is detached from the switching valve, the clipper 161B is just rotated to the open position. There is no concern of the clipper 161B being lost. No accidental detachment of the cartridge from the switching valve occurs so long as the connecting portion between the cartridge 102 and the switching valve 101 is closed and covered by the clipper 161B.

We claim:

1. A diverter for use with a faucet of a water supply pipe to select a plurality of water passages, the diverter comprising:

a substantially cylindrical body which defines therein a main water passage to be connected to the faucet; and a rotatable selecting member which is coaxially and rotatably fitted on the substantially cylindrical body and which is provided with a plurality of branch water passages which are selectively registered with the main passage of the substantially cylindrical body in accordance with the rotation of the selecting member.

2. A diverter according to claim 1, wherein said rotatable selecting member is provided with at least two branch water passages for a straight unfiltered water flow and a flow of water to be purified.

3. A diverter according to claim 1, wherein said rotatable selecting member is provided with at least three branch water passages for a straight unfiltered water flow, a spray unfiltered water flow, and a flow of unfiltered water to be purified.

4. A diverter according to claim 1, wherein at least one of the branch water passages has an exposed open outlet end to which a filter cartridge is connected.

5. A diverter according to claim 1, wherein said substantially cylindrical body is provided on the peripheral side wall thereof with at least one cross hole which is connected to the main water passage and which opens into the outer peripheral surface of the substantially cylindrical body.

6. A diverter according to claim 1, further comprising a rotating ring which is provided on the substantially cylindrical body to detachably attach the diverter to the faucet.

7. A diverter according to claim 2, wherein said selecting member is provided with an outlet opening connected to the branch water passage for a straight unfiltered water flow.

8. A diverter according to claim 3, wherein said selecting member is provided with outlet openings connected to the branch water passages for a straight unfiltered water flow and a spray unfiltered water flow.

9. A diverter according to claim 8, further comprising a spray attachment attached to the bottom of the selecting member to cover the outlet opening for a spray unfiltered water flow.

10. A diverter according to claim 1, wherein said selecting member is provided with a connector portion to which a replaceable filter cartridge is detachably attached.

11. A diverter according to claim 10, wherein said connector portion includes a projection having a pair of guide grooves.

12. A diverter according to claim 11, wherein said guide grooves are each provided with a curved bottom surface whose height gradually increases in a predetermined direction.

13. A diverter according to claim 12, wherein said guide grooves are each provided with a locking bottom surface portion stepped with respect to the curved bottom surface.

14. A diverter according to claim 13, wherein at least one of the branch water passages has an exposed open outlet end to which a replaceable filter cartridge is connected, and wherein said guide grooves are located in a symmetrical arrangement with respect to an axis of the open outlet end of the at least one branch passage.

15. A diverter according to claim 1, wherein said rotatable selecting member is oriented so as to be rotatable about a vertical axis.

16. A filter cartridge and diverter combination, wherein the filter cartridge is detachably attached to the diverter which is detachably attached to a faucet of a water supply pipe to select a plurality of water passages, said filter cartridge purifying water supplied through said diverter, said diverter being provided with a connector portion including a projection having a pair of guide grooves, wherein;
said filter cartridge comprises an engaging portion which is slidably inserted and fitted in the guide grooves to attach said filter cartridge to said diverter, said filter cartridge bring detached from said diverter by sliding said engaging portion out of said guide grooves.

17. A filter cartridge and diverter combination according to claim 16, wherein said guide grooves are each provided with a curved bottom surface whose height gradually increases in a predetermined direction, and wherein said engaging portion of the filter cartridge is provided with a pair of elastically deformable arms which are elastically deformed by the curved bottom surfaces of the guide grooves during the insertion of the engaging portion in the guide grooves.

18. A filter cartridge and diverter combination according to claim 17, wherein said guide grooves are each provided with a locking bottom surface portion stepped with respect to the curved bottom surface, and wherein said elastically deformable arms of the engaging portion of the filter cartridge are each provided with an enlarged head which is engaged by the locking bottom surface portions of the guide grooves when the elastically deformable arms of the engaging portion of the filter cartridge are completely fitted in the corresponding guide grooves.

19. A water purifier comprising a diverter which is detachably attached to a water faucet to select a plurality of water passages and a filter cartridge which is replaceably attached to the diverter to purify a water to be supplied through the diverter; wherein,
said diverter is provided with a connector portion including a projection having a pair of guide grooves; and
said filter cartridge is provided with an engaging portion which is slidably inserted and fitted in the guide grooves.

20. A water purifier according to claim 19, wherein said diverter comprises a substantially cylindrical body which defines therein a main water passage to be connected to the faucet, and a rotatable selecting member which can be coaxially and rotatably fitted on the substantially cylindrical body and which is provided with a plurality of branch water passages which are selectively registered with the main water passage of the substantially cylindrical body in accordance with the rotation of the selecting member around a vertical axis.

21. A water purifier according to claim 20, wherein said guide grooves are each provided with a curved bottom surface whose height gradually increases in a predetermined direction, and wherein said engaging portion of the filter cartridge is provided with a pair of elastically deformable arms which are elastically deformed by the curved bottom surfaces of the guide grooves during the insertion of the engaging portion in the guide grooves.

22. A water purifier according to claim 21, wherein said guide grooves are each provided with a locking bottom surface portion stepped with respect to the curved bottom surface, and wherein said elastically deformable arms of the engaging portion of the filter cartridge are each provided with an enlarged head which are engaged by the locking bottom surface portions of the guide grooves when the elastically deformable arms of the engaging portion of the filter cartridge are completely fitted in the corresponding guide grooves.

23. A water purifier according to claim 20, further comprising a clipper which is attached to the connecting portion between the diverter and the filter cartridge to hold the connecting portion.

24. A water purifier according to claim 23, wherein said clipper is provided with a pair of side plates and a connecting plate which connects the side plates to form a generally U-shape in a cross section, so that the side plates are elastically deformed.

25. A water purifier according to claim 24, wherein said clipper is provided on one of the side plates, with an opening or recess, and wherein said engaging portion of the filter cartridge is provided with a projection which is engaged in the opening or recess of the clipper when the clipper is attached to the connecting portions between the diverter and the filter cartridge.

26. A water purifier according to claim 24, wherein said clipper is provided with a ring member integral therewith, which can be rotatably and coaxially attached to the diverter.

27. A water purifier comprising a diverter which is detachably attached to a water faucet to select a plurality of water passages and a filter cartridge which is replaceably attached to the diverter to purify a water to be supplied through the diverter, wherein:
said diverter is provided with a connector portion including a projection having a pair of guide grooves; and
said filter cartridge is provided with an engaging portion which is inserted and fitted in the guide grooves;
wherein the water purifier further comprises a clipper which is attached to the connecting portion between the diverter and the filter cartridge to hold the connecting portion.

* * * * *